United States Patent [19]

Heitzenröder et al.

[11] Patent Number: 4,564,107

[45] Date of Patent: Jan. 14, 1986

[54] CONTAINER FOR THE PRESSURE TIGHT PACKAGING OF ARTICLES, IN PARTICULAR TENNIS BALLS

[75] Inventors: Hans F. Heitzenröder, Langenselbold; Ernst Wachter, Hanau; Kurt Bitsch, Langenselbold, all of Fed. Rep. of Germany

[73] Assignee: Dunlop Aktiengesellschaft, Hanau, Fed. Rep. of Germany

[21] Appl. No.: 578,523

[22] Filed: Feb. 9, 1984

[30] Foreign Application Priority Data

Feb. 10, 1983 [DE] Fed. Rep. of Germany ....... 3304590

[51] Int. Cl.<sup>4</sup> .............................................. B65D 81/20
[52] U.S. Cl. .................. 206/315.9; 206/632; 229/48 T; 383/3; 383/113
[58] Field of Search ...... 206/522, 315.9, 830, 206/631, 632, 634; 383/3, 113, 108, 109; 229/48 T, 87 C

[56] References Cited

U.S. PATENT DOCUMENTS

| Re. 27,038 | 12/1973 | Leasure et al. ...................... 206/632 |
| 1,935,612 | 11/1933 | Brady ...................................... 383/109 |
| 2,339,305 | 1/1944 | Wagner ............................... 229/48 T |
| 2,355,108 | 8/1944 | Reese .................................... 220/276 |
| 2,554,841 | 5/1951 | Kumsey, Jr. ...................... 206/315.9 |
| 2,582,982 | 1/1952 | Gammeter . |
| 2,975,955 | 3/1961 | McCurry ........................... 229/48 T |
| 3,058,575 | 9/1962 | Gerard ................................. 383/109 |
| 3,067,923 | 12/1962 | Thiets ................................ 229/48 T |
| 3,268,184 | 8/1966 | Biggar et al. ........................ 206/522 |
| 3,533,550 | 10/1970 | Benzon-Petersen .............. 229/87 C |
| 3,542,190 | 11/1970 | Keller ................................... 206/632 |
| 3,556,816 | 1/1971 | Nughes ............................... 229/48 T |
| 4,235,365 | 11/1980 | Yoshii et al. ......................... 383/108 |
| 4,384,646 | 5/1983 | Sakamoto et al. ................ 206/315.9 |

FOREIGN PATENT DOCUMENTS

| 506757 | 10/1954 | Canada .................................. 383/109 |
| 1134 | 3/1979 | European Pat. Off. ............ 206/634 |
| 1747782 | 4/1957 | Fed. Rep. of Germany . |
| 2326594 | 12/1974 | Fed. Rep. of Germany . |
| 985889 | 7/1951 | France .................................. 383/109 |
| 1442465 | 5/1966 | France . |
| 1549124 | 10/1968 | France .................................. 383/109 |
| 173940 | 1/1961 | Sweden ................................ 206/631 |

Primary Examiner—William T. Dixson, Jr.
Assistant Examiner—Brenda J. Ehrhardt

[57] ABSTRACT

Figure 4:
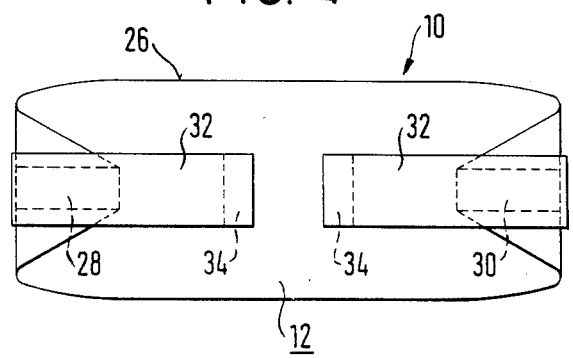

A container (10) for the pressure tight packaging of articles, in particular tennis balls, is described which consists of a multiple layer foil (12) which is matched at least substantially to the shape of the articles to be packaged and is closed by welded seams (26, 28, 30). The multiple layer foil embraces at least one layer of a gas impermeable material, and at least one layer of a strength giving material with at least the layer which forms the interior surface of the container being weldable. At least one part of the weld seams is formed without overlapping by welding together the interior surfaces of the container. The non-overlapped weld seams are folded-back onto the body of the container and secured to the body of the container by a tape (32) or by an adhesive strip (FIG. 4).

28 Claims, 8 Drawing Figures

U.S. Patent   Jan. 14, 1986   Sheet 3 of 3   4,564,107

CONTAINER FOR THE PRESSURE TIGHT PACKAGING OF ARTICLES, IN PARTICULAR TENNIS BALLS

The invention relates to a container for the pressure tight packaging of articles, in particular tennis balls.

It is often expedient and necessary for the storage or despatch of certain goods to package these goods in containers under pressure. By way of example tennis balls, if not stored under pressure, loose some of their internal pressure and thus some of their rebound resilience. For this reason tennis balls are nowadays preferably stored in containers, such as tins, with an internal pressure which is elevated in comparison with the atmospheric pressure.

The packaging of tennis balls in tins admittedly provides satisfactory results with regard to the pressure tight packaging of the balls, it is however relatively complicated and associated with high costs so that the packaging of smaller numbers of balls or individual balls is already prohibited for purely economic reasons.

Containers manufactured of synthetic foils are also known.

Such containers have however deficiencies, in particular with regard to their impermeability to gases and/or the strength of the welded seams.

The use of aluminium foils for the packaging of various articles is also known, however for the packaging of articles in a container under pressure a very thick foil is required for strength reasons. A foil of this kind is expensive, is no longer adequately flexible and can thus only be adapted with difficulty to the required form of the articles to be packaged. The use of such aluminium foils with the required thickness would almost amount to the same thing as the use of a tin.

The principal object underlying the invention is to provide a container of the initially named kind which can be manufactured economically and without problem and which has ideal characteristics both from the standpoint of a cost favourable packaging material and a simplification of the packaging process, in particular closing and pressurising, and also from the standpoint of providing a reliable pressure tight packaging for articles with the desired container strength, with the container still being economical even for the manufacture of relatively small numbers of packages and for the packaging of only a few articles or of individual articles.

This object is satisfied in accordance with the invention in that the container consists of a multiple layer foil which is substantially matched to the shape of the articles to be packaged and is closed via welded seams, and which includes at least one layer of material impermeable to gas and at least one layer which is able to withstand at least the pressure within the container, with at least the layer which forms the interior surface of the container being weldable.

As a result of this construction a container is obtained for bodies under pressure, such as tennis balls, which is extremely economical to manufacture and which meets all the requirements with regard to impermeability to gas, strength and weldability of the packaging material.

As a result of the intentional association of specific functions with the individual layers (impermeability to gas, strength and weldability) the individual layers can each be ideally laid out, or their thicknesses appropriately dimensioned, so that on the whole a material results which is comparatively priceworthy, which is substantially problemfree with regard to the actual packaging process, and which on the whole has very positive characteristics. It is also of advantage that the thickness of the foil can be kept relatively small. The multiple layer of foil can be so laid out by appropriate dimensioning of the corresponding layers that the packaging can be matched without problem at least substantially to the shape of the articles which are to be packaged, but on the other hand has sufficient strength to withstand the pressure within the container and the loads which may for example occur during transport of the container.

The multiple layer foil advantageously includes, apart from the layer impermeable to gas and the layer with a strength which withstands at least the pressure within the container, a further weldable layer at the side which forms the internal surface of the container.

In a further variant it is envisaged that the multiple layer foil includes a further weldable layer on the side which forms the outer surface of the container. A layer of this kind on the outer side of the foil is however only necessary if overlapped connections, i.e. weld seams, are envisaged which are obtained by welding the container inner surface with the container outer surface.

By using separate layers, on the one hand of a strength giving material and on the other hand of a weldable material, the dimensioning of the multiple layer foil is further simplified with regard to the two characteristics strength and weldability. A partial reduction of the number of layers is however also fundamentally conceivable in as much as one layer may simultaneously have good strength and welding characteristics.

In an embodiment which is preferred in practice the central layer of the multiple layer foil is formed by the layer of gas impermeable material and respective layers of strength giving material are arranged on each side of this gas impermeable layer.

The gas impermeable layer preferably consists of aluminium and the strength giving layers of polyester.

The weldable layers of the multiple layer foil are expediently layers which already endow the weld seams with a high strength at a temperature which lies only a little below the softening temperature required for the welding. The presence of a so-called "hot tack" which is as good as possible ensures that long cooling down times are not necessary after pressing of the relevant seams. The weldable layers of the multiple layer of foil advantageously consist of polyethelene or polypropylene.

In an embodiment which is preferred in practice at least a part of the weld seams is formed without overlapping by welding together the internal surfaces of the container, these non-overlapping weld seams are folded back onto the body of the container and secured by at least one tape, an adhesive strip or the like.

When using such welded seams without overlap the opening of the container is considerably simplified as a result of the relatively low strength of these welded seams. Because of the fact that these welded seams are folded-back on the body of the container and completely secured to the container body in contact therewith by the tape they are nevertheless able to withstand the pressure within the container and also the loads which act on the container. Whereas a pressure tight packaging is always ensured by the folded-back welding seams which are secured by the tape the welded seam can, by way of example, be opened after removal of the tape simply by exerting a light pressure on the packaging through the associated pressure increase in the package.

The container is advantageously closed by at least one longitudinal welded seam and at both ends, in each case by a transverse weld seam, with at least the transverse weld seams, which are formed without overlap by welding together the internal surfaces of the container, being folded-back onto the body of the container and being secured by the tape.

In order to manufacture a packaging for tennis balls one can, in this case, for example, form a narrow strip of the multiple layer foil into a long hose-like structure by welding it together along a longitudinal seam. Pieces with a length corresponding to the number of tennis balls to be packaged can now be cut from this hose. One can either weld together one end of the hose, then insert the balls and subsequently weld together the other end, or one can first insert the balls into the section of hose and then simultaneously weld together the two open ends. The generation of the excess pressure in the package can take place after closure, for example via valves or openings which are subsequently closed. It is however also possible, by way of example, to insert a gas-forming tablet into the container together with the tennis balls, with the tablet generating the desired excess pressure after closure of the container. It is also possible to close the container in a cooled gas atmosphere at atmospheric pressure, whereupon the desired pressure within the container is generated on subsequent warming of the container as a result of the environmental temperature.

The principle of folding back and securing the transverse seams is basically also usable for other packagings which do not have a longitudinal seam, for example with a seamless hose manufactured by extrusion which would then only have to be closed by transverse seams.

A further preferred embodiment of the invention, in which the multiple layer foil has a weldable layer both on the side which forms the internal surface of the container and also on the side which forms the external surface of the container, consists of an arrangement in which the longitudinal weld seam is an overlapping seam which is formed by welding the internal surface of the container to the external surface of the container. A longitudinal weld seam of this kind obtained by an overlapping connection of the two edge parts of the multiple layer foil is relatively flexible and is better adapted to the folding processes. As a result of this overlapping connection the longitudinal seam is adequately strong and does not need to be secured by an adhesive tape or the like.

The weld seams can expediently be arranged so that they form a continuous seam.

The tape is advantageously attached to the body of the container in the direction of the non-overlapping and folded back weld seams and covers at least these non-overlapping weld seams.

The tape is preferably wound around the whole body of the container so that the danger of unintentional release of the tape, and thus opening of the container, is not present, even for large loads.

If the weld seams form a continuous seam then the tape can be wound around the body of the container in a direction whereby the tape covers or secures all weld seams. The tape expediently has a tearing aid for the opening of the container. This tearing aid can for example be a ripping seam with a suitable ripping element. It is however also conceivable that the tape or the adhesive strip is simply folded over at the ends so that the ends do not adhere to the body of the container and so that the tape can be torn away from the container at these ends.

A particularly advantageous embodiment consists of an arrangement in which at least a part of the non-overlapping weld seams formed by welding together the internal surfaces of the container is so laid out that it only withstands the pressure within the container with the assistance of the tape and opens without further manipulation on pulling away the tape.

Whereas, in the latter embodiment, the container opens along a non-overlapping welded seam, in particular a transverse welded seam at an end face of the longitudinal container, and the articles received in the container are extracted or pressed out of the end of the container, it is often expedient, depending on the nature of the packaged articles, to ensure that the container can be opened along a longitudinal side. For this purpose it is envisaged, in accordance with a further advantageous variant which is preferred in the practice, that at least one of the nonoverlapping transverse weld seams and at least one overlapping longitudinal weld seam form a continuous seam which lies at least substantially in one plane, and that at least one tearing aid is provided in this transverse weld seam, preferably in the vicinity of an adjoining longitudinal weld seam, with the tearing aid consisting in particular of a weakened portion of the material or a notch which preferably extends over half the width of the transverse weld seam.

In this arrangement the end of the transverse weld seam which has the tearing aid, for example a notch is first freed by pulling off the adhesive tape. After the ear of the welded seam having the notch has become erect, as a result of the pressure within the container, the packaging can be opened by pulling on the ear to tear the transverse weld seam in the region of the notch and by pulling further on this ear after venting of the package because the package then tears open on both sides of the longitudinal seam, in practice in the same way as at a weakened breakage line. The package is thus opened over its full length so that the articles can be readily extracted.

The two ends of at least the transverse weld seam having the tearing aid are preferably folded back onto the associated end face of the elongate container and secured to the container in contact therewith.

As a result of this construction it is ensured that the two ears or peaks of the associated transverse welded seam are always reliably secured to the body of the container in contact therewith by the tape, even of a higher pressure prevails within the container, and that the natural stresses at the ends or ears of the transverse welded seam cannot lead to the adhesive tape being prematurely released.

The longitudinal welded seam is advantageously folded at the end face in the middle so that it forms a reinforced section of the transverse welded seam. In this way an precise weakened line of tearing is effectively specified on both sides of the longitudinal weld seam.

A further advantageous embodiment of the container consists of an arrangement in which the end of the transverse weld seam which is formed without a tearing aid and is folded back onto the end face, is additionally secured to the end face independently of the tape which secures the end provided with the tearing aid. After pulling away the tape associated with the ear having the tearing aid it is not the whole transverse welded seam which erects, but rather only the peak having the tearing aid, so that as a result of the section of the transverse welded seam still secured to the body of the container this transverse welded seam remains closed even with a higher pressure within the container. The container is slowly and noiselessly ventilated only on tearing the seam in the region of the notch.

If, after ventilation of the container, the ear of the transverse weld seam having the tearing aid is pulled further then the container opens along the weakened lines of fractures resulting on both sides of the longitudinal welded seam, whereas the transverse welded seam generally remains closed at least in the region which is still secured to the body of the container.

The end of the transverse welded seam which is formed without the tearing aid is expediently secured by welding, by an adhesive or by a further tape, in particular a tape which extends across the transverse welded seam, to the end face of the container.

The tape which secures the end of the transverse welded seam provided with the tearing aid to the end face preferably extends along the transverse welded seam over the entire end face of the container and at least partly along one of the two sides of the container.

In order to open the container this tape is now generally torn away only by an amount such that the ear of the transverse weld seam having the tearing aid erects. The additional fixing of the other ear of the transverse welded seam however ensures that the other ear of the transverse welded seam still remains secured in contact with the end face of the container, even on pulling the tape which secures the end provided with the tearing aid, or on fully tearing away this tape. Thus it is always only the ear of the transverse welded seam having the tearing aid which erects and the container is only ventilated on tearing it in the region of the tearing aid.

Figure 1:
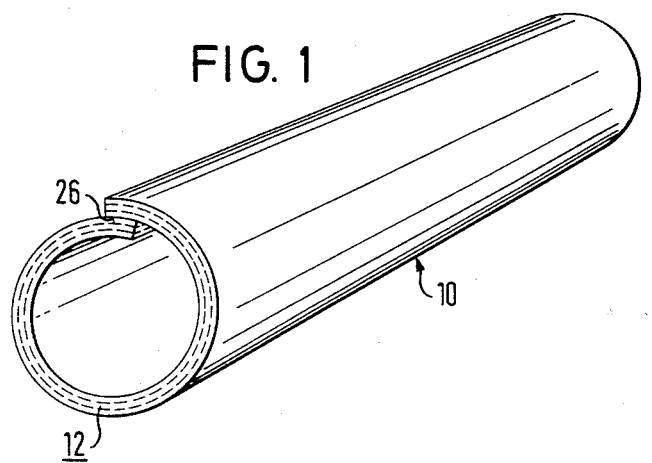
Figure 2:
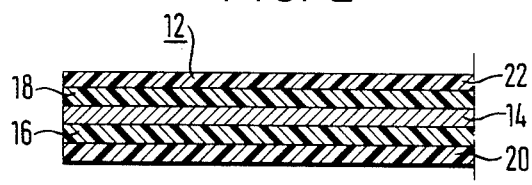
Figure 3:
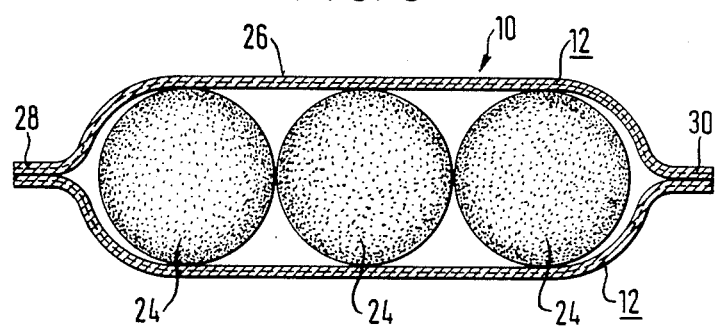
Figure 8:
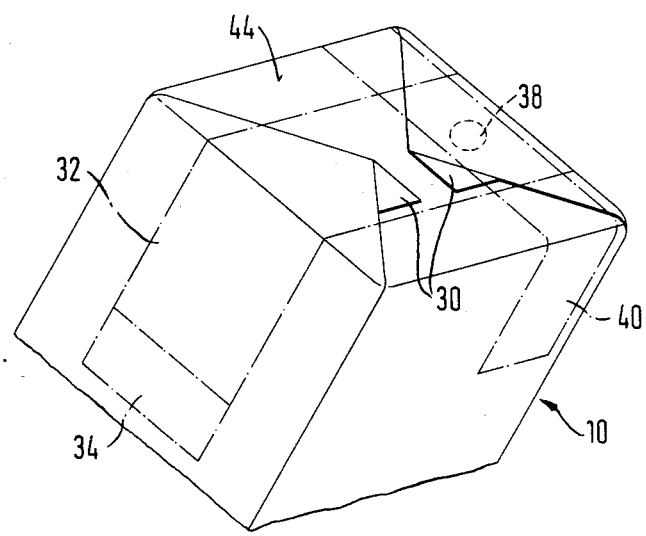
Figure 5:
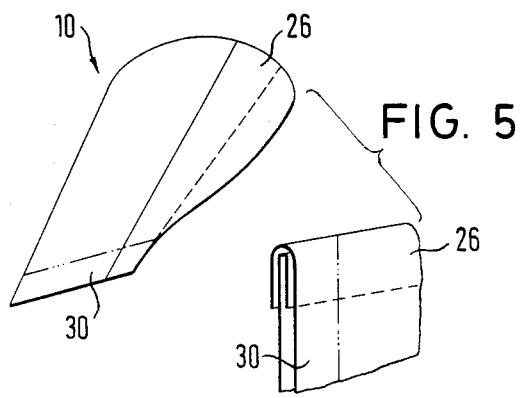
Figure 6:
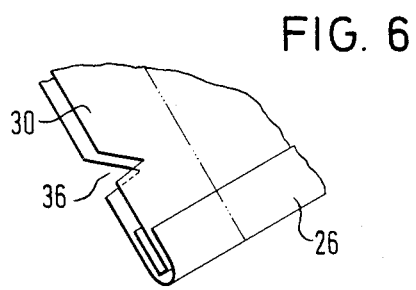
Figure 7:
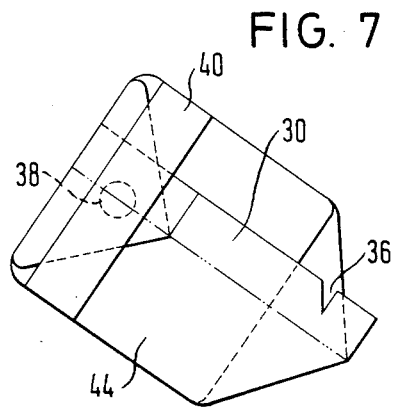

The invention will now be explained in more detail in the following with reference to examples and to the drawings which show:

FIG. 1 a perspective view of a first embodiment of a container for the pressure tight packaging of tennis balls, prior to introduction of the tennis balls, FIG. 2 a cross-section of a multiple layer foil from which the container is formed, FIG. 3 a longitudinal section of the container wherein the container is however already filled and the two container ends are closed, FIG. 4 a plan view of the container in its final form with transverse weld seams which are folded-back onto the body of the container and secured by a band, FIG. 5 a perspective view of a second embodiment of the container in which the end forming the cover is already closed, and also a partial view of a corner of the closed end, FIG. 6 a partial view of the corner of the closed end showing a notch, FIG. 7 an end view of the already filled container of FIGS. 5 and 6 in which one end of one of the transverse weld seams has already been fixed to the body of the container, and FIG. 8 a perspective partial view of one end of the container of FIGS. 5 to 7 in its final form with the ends of the transverse weld seam folded-back onto the end face and secured by two bands.

FIGS. 1, 3 and 4 show a first embodiment of a container 10 for the pressure tight packaging of tennis balls 24. The container is formed from a multiple layer foil 12 (see in particular FIG. 2). In FIG. 1 the container 10 is shown in the form which it has prior to introduction of the tennis balls and prior to closure of its two ends. In the illustration of FIG. 3 the container 10 is already filled and has been closed at its two ends. In the representation of FIG. 4 the container 10 is shown in the final form in which it is ready for storage or dispatch.

In the figures common reference numerals are used for parts which correspond to one another. The multiple layer foil 12 from which the container 10 is manufactured includes a central layer 14 of gas impermeable material, for example aluminium, a respective layer 16, 18 of a material which endows the body with the required strength, for example polyester, on the two sides of this gas impermeable layer 14, and respective layers 20, 22 of weldable material, for example polyethelene (FIG. 2), on the side which forms the interior surface of the container and on the side which forms the external surface of the container.

Specific functions such as gas impermeability, strength and weldability are thus respectively associated with the individual layers of the multiple layer foil 12. The thicknesses of the respective layers are dimensioned so that an ideal container material results having regard to gas impermeability, strength and weldability. The thickness of the foils can hereby be kept relatively small.

For the manufacture of the container 10 a narrow strip of the multiple layer foil 12 is first formed into an elongate hose-like structure by welding along an overlapping longitudinal seam 26. Pieces with a length which corresponds to the number of tennis balls 24 that are to be packaged are then cut from this hose (FIG. 1).

The container is now closed at its two ends, in each case by a transverse weld seam 28, 30 with the transverse weld seams being obtained by welding together of the internal surfaces of the container (FIG. 3). One can, for example, initially weld together one end of the container 10, insert the tennis balls 24 and then weld together the other end. It is however also possible to first insert the tennis balls into the container and then to simultaneously weld together both open ends.

The generation of the required pressure in the container can take place after closure of the container, for example via valves or openings which have to be closed subsequently (not shown). It is however more expedient to insert a gas forming tablet into the container with the tennis balls, whereupon the desired excess pressure is created after closing of the container. The container can however also be closed in a cooled gas atmosphere at atmospheric pressure, whereupon the higher internal pressure is created as a result of warming up of the container through the environmental temperature.

In the present case three tennis balls 24 are packaged. The use of a container of this kind is however still entirely economical even when packaging individual tennis balls.

After closing of the container 12 the two transverse weld seams 28, 30 which have each been manufactured without overlapping of the corresponding edges of the multiple layer foil are folded back on the body of the container and are secured to the body of the container in contact therewith by at least one tape 32, by an adhesive strip or the like (FIG. 4). As the container adopts a substantially cylindrical shape through the tennis balls there is a relatively complicated transition to the transverse weld seams. These transverse weld seams retain their full length which is accordingly larger than the diameter of the cylindrical body of the container. The folding of the container ends with the transverse weld seams therefore take place in several dimensions. As can be seen in FIG. 4 the transverse weld seams 28, 30 actually contact both the respective end surfaces and also two oppositely disposed side surfaces of the container.

The tape 32 is attached to the body of the container in the direction of the non-overlapping transverse weld seams 28, 30 which are folded-back on the body of the container, and extends substantially around the entire body of the container. The tape 32 is somewhat broader than the transverse weld seams so that these are entirely covered by the tape. The tape can however also extend over substantially the full width of the container. The non-overlapping transverse weld seams 28, 30 formed by welding of the interior surfaces of the container are each laid out in such a way that they withstand the pressure inside the container only with the support of the tape 32 and open on pulling off of the tape, either without further manipulation or by simply exerting a gentle pressure on the container. By securing the two transverse welded seams to the ends of the hose-like packaging the requirements placed on their strength are thus reduced which greatly facilitates the opening of the package.

In this case care should be taken that the desired pressure in the container is only created after the transverse welded seams are secured to the body of the container by the tape 32. In the illustrated embodiment the longitudinal weld seam 26 intersects the two transverse weld seams 28, 30 approximately perpendicularly at their centers. In this way both the manufacture of the transverse welded seams and also the folding of the end regions of the container are made easier. As a result of the overlapping connection the longitudinal welded seam 26 is adequately strong and does not need to be secured by an adhesive strip.

The longitudinal weld seam 26 as a result of this overlapping connection can better adapt itself to the folding procedure.

As the tape 32 is laid in the direction of the transverse welded seams the corners of the transverse welded seams automatically contact the body of the container.

In the present embodiment the tape 32 which secures the transverse weld seams 28, 30 has a tearing aid 34. This tearing aid is obtained in simple manner in as much as the tape ends are folded over, and thus do not adhere to the body of the container, so that the tape can be easily torn away from the body of the container via these ends. A loop or the like can however also be provided as a tearing aid.

A further embodiment of the container 10 is shown in FIGS. 5 to 8 which, in the same way as the container described in FIGS. 1, 3 and 4, can again be formed from a multiple layer foil 12 of the type described in connection with FIG. 2. In FIG. 5 the container is shown in the form which it has after producing the longitudinal weld seam 26 and also the transverse weld seam 30 present at the cover forming end. In the lower right hand section of FIG. 5 the corner region of the container is reproduced at which the longitudinal weld seam 26 and the transverse weld seam 30 are superimposed. FIG. 6 shows a view of this corner region of the end of the container from below, with a notch 36 being provided in the transverse weld seam 30. FIG. 7 shows an end view of the container in which initially only the end of the transverse weld seam which is formed without a notch is folded back onto the body of the container. In the illustration of FIG. 8 the container is shown in its final form in which it is ready for storage for despatch.

In the second embodiment of the container the non-overlapping weld seam 30 provided at the cover side end and the overlapping longitudinal weld seam 26 form a continuous seam which extends substantially in one plane (see FIG. 5). In this arrangement the longitudinal weld seam 26 is folded at the middle of the end face so that it forms a reinforced section of the transverse weld seam 30. Thus in this corner region one half of the longitudinal weld seam 26 lies on one side of the container and the other half of this seam lies on the opposite side of the container 10. As can be clearly seen from the illustration at the bottom right hand side in FIG. 5 the corner region of this end of the container thus has a thickness which corresponds to four times the thickness of the normal container wall. A notch 36 is provided in one of the two end regions of the transverse weld seam 30 in the vicinity of the adjoining longitudinal weld seam 26. The notch extends over substantially half the width of this transverse weld seam and serves as a tearing aid (see in particular FIG. 6).

As can be seen from FIG. 7 the end or ear of the transverse weld seam 30 formed without a notch is first folded back onto the relevant end face 44 of the container and is particularly secured by an adhesive 38 and also by a tape 40 which extends transverse to the transverse welded seam 30. Finally the end or ear of the transverse welded seam 30 which has the notch 36 is folded back onto the end face 44 and is secured to this end face in contact therewith by means of the tape 32 having the tearing aid 34 (see FIG. 8).

The end of the transverse welded seam 30 formed without the tearing aid and folded back onto the end face 44 is thus secured to the end face additionally and independently from the tape 32 which secures the end provided with the tearing aid and/or notch 36.

Whereas the tape 40 for additional securing of the end of the transverse weld seam 30 formed without a tearing aid extends transversely to this transverse weld seam, the upper tape 32 extends along and parallel to this transverse weld seam. Each of the two tapes 32, 40 is guided from one side surface of the package or container over the end face.

The base of this container can again be formed in the same manner as has already been described in connection with the embodiment of FIGS. 1, 3 and 4.

In order to open the container the tape 32 is now torn off by means of the tearing aid 34 until the end or ear of the transverse weld seam provided with the notch 36 becomes erect as a result of the pressure in the container. Even when this tape 32 has been torn further or completely away the other ear of the transverse weld seam 30, which has been particularly secured by the adhesive 38 and also the tape 40, remains secured in contact with the end face 44. In this way the transverse weld seam 30 is prevented from erecting completely and from suddenly opening with a loud bang.

After this the projecting ear of the transverse weld seam 30 having the notch 36 is grasped and is drawn towards the base side along the longitudinal welded seam 26. After the notch has been torn by pulling the appropriate ear of the transverse welded seam 30 and after the slow and relatively quiet venting of the container the container can be opened by pulling further on the ear so that it tears on both sides of the longitudinal seam in similar manner to tearing along desired line of fracture. After the container has been opened along its full length the balls can be extracted without problem. The ends of the transverse weld seam which are folded-back onto the end face 44 ensure, amongst other things, also that the ends of the transverse weld seam are always reliably held by the tapes 32, 40 against the end surface 44 and that a premature release of these adhesive tapes cannot occur through the inherent tension of the ends or ears of this transverse welded seam.

We claim:

1. A self-supporting pressure-tight container, especially for tennis balls, said container consisting of a strip of a multi-layer foil defining an inner surface and an outer surface of said container, said strip having spaced opposite edges, said foil including a layer impermeable to gas, and at least one layer capable of withstanding the pressure within the container, the layers defining said inner and outer surfaces being of the same material and being weldable, said foil being welded to itself along a longitudinal seam formed between overlapping portions of the inner surface of the foil at one of said edges and the outer surface of the foil at the other edge, said container having at each end a transverse weld seam, said transverse weld seams being formed without overlap by welded-together confronting portions of said internal surface; said transverse weld seams being folded back onto the container; means for pressurizing said container and means for securing said folded back weld seams to said container.

2. A container according to claim 1, comprising two layers capable of withstanding the pressure within the container, one layer each on opposite sides of said impermeable layer.

3. A container according to claim 1, wherein the gas impermeable layer consists of aluminum.

4. A container according to claim 1, wherein said at least one layer capable of withstanding the pressure within the container consists of polyester.

5. A container according to claim 1, wherein said weldable layers have a high strength at a temperature which lies only a little below the softening temperature required for welding.

6. A container according to claim 1, wherein the weldable layers consist of polyethelene.

7. A container according to claim 1, wherein said securing means is an adhesive strip.

8. A container according to claim 1, wherein said seams form a continuous seam.

9. A container according to claim 1, wherein said securing means extends in the direction of the non-overlapping and folded-back seams and completely covers at least said non-overlapping weld seams.

10. A container according to claim 1, wherein said securing means is wound at least substantially around the entire container in the direction of the non-overlapping and folded-back seams.

11. A container according to claim 1, wherein said securing means has a tearing aid for opening the container.

12. A container according to claim 1, wherein the non-overlapping seams are arranged such that they withstand the pressure within the container in each case only with the aid of said securing means, and open without further manipulation upon tearing away of said securing means.

13. A container according to claim 1, wherein at least one of the non-overlapping transverse weld seams and at least one overlapping longitudinal weld seam form a continuous seam which lies at least substantially in one plane; and wherein at least one tearing aid is provided in said at least one transverse weld seam, said tearing aid consisting of a weakened portion.

14. A container according to claim 1, wherein at least one of the non-overlapping transverse weld seams and at least one overlapping longitudinal weld seam form a continuous seam which lies at least substantially in one pleane; and wherein at least one tearing aid is provided in said at least one transverse weld seam, said tearing aid consisting of a notch.

15. A container according to claim 14, wherein said notch extends over half the width of the transverse weld seam.

16. A container according to claim 13, wherein said tearing aid is located in the vicinity of said longitudinal weld seam.

17. A container according to claim 13, wherein ends of said at least one transverse weld seam having said tearing aid are folded back onto an end face of the container, and means securing the ends to the container in contact therewith.

18. A container according to claim 13, wherein the longitudinal weld seam is folded at an end face of the container in the middle and forms a reinforced section of said at least one transverse weld seam.

19. A container according to claim 17, wherein the end of the transverse weld seam which is formed without a tearing aid and is folded back onto the end face is secured to the end face independently of the means securing the end provided with the tearing aid.

20. A container according to claim 19, wherein the end of the transverse weld seam without a tearing aid is welded or glued to the end face of the container.

21. A container according to claim 19, comprising a further means for securing the end of the transverse weld seam without a tearing aid to the end face of the container and extending across the transverse weld seam.

22. A container according to claim 19, wherein said means securing the end of the transverse weld seam with the tearing aid to the end face extends along the transverse weld seam over the entire end face and at least partly along at least one of two sides of the container.

23. A container according to claim 1, wherein first and second transverse weld seams are formed at first and second ends of said container; wherein first and second ears are defined at respective end regions of said first transverse weld seam and third and fourth ears at respective end regions of said second transverse weld seam; said first, second, third and fourth ears being folded onto said container, said first, second and third ears being welded to said container; and a strip of adhesive tape securing said fourth ear to said container.

24. A container according to claim 23, wherein a tearing aid is provided in said fourth ear.

25. A self-supporting pressure-tight package for the storage of articles such as tennis balls under pressure, said package consisting of a strip of a multi-layer foil defining an inner surface and an outer surface of said package; said strip having spaced opposite edges; said foil having at least three layers including a layer impermeable to gas, and a layer capable of withstanding the pressure within the package, the layers defining the inner and outer surfaces being of the same material and being weldable to one another; said package having at each end a transverse weld seam, said transverse weld seams being formed without overlap by welded-together confronting portions of said internal surface; said transverse weld seams being folded back onto the package; means for pressurizing said package; and means for securing said folded back weld seams to said package.

26. A self-supporting pressure-tight package in accordance with claim 25, wherein said multi-layer foil comprises a first layer of polyethylene, a second layer of polyester, a third layer of aluminum, a fourth layer of polyester, and a fifth layer of polyethylene.

27. A self-supporting pressure-tight package in accordance with claim 25, wherein first and second transverse weld seams are formed at first and second ends of said package; wherein first and second ears are defined at respective end regions of said first transverse weld seam, and third and fourth ears at respective end regions of said second transverse weld seam; said first, second, third and fourth ears being folded onto said package; said first, second and third ears being welded to said package; and a strip of adhesive tape securing said fourth ear to said package.

28. A self-supporting pressure-tight package in accordance with claim 27, wherein a tearing aid is provided in said fourth ear.

* * * * *